United States Patent [19]

Giese

[11] Patent Number: 4,604,949
[45] Date of Patent: Aug. 12, 1986

[54] MEAT PRESS

[75] Inventor: John D. Giese, Berkeley, Calif.

[73] Assignee: Mepaco, Inc., Oakland, Calif.

[21] Appl. No.: 673,899

[22] Filed: Nov. 20, 1984

[51] Int. Cl.[4] .......................... A22C 7/00; B30B 7/02
[52] U.S. Cl. ..................................... 100/194; 17/1 R; 17/44.2
[58] Field of Search ............... 17/1 R, 32; 100/910, 100/194

[56] References Cited

U.S. PATENT DOCUMENTS

| | | | |
|---|---|---|---|
| 170,488 | 11/1875 | Morehouse | 100/194 |
| 320,006 | 6/1885 | Shearer | 100/194 X |
| 3,618,511 | 11/1971 | Matthews | 100/910 X |
| 4,224,864 | 9/1980 | Wendell | 100/194 X |

FOREIGN PATENT DOCUMENTS

| | | | |
|---|---|---|---|
| 199519 | 11/1907 | Fed. Rep. of Germany | 100/194 |
| 0109598 | 8/1980 | Japan | 100/194 |

Primary Examiner—Willie G. Abercrombie
Attorney, Agent, or Firm—Robert B. Chickering; Glen R. Grunewald

[57] ABSTRACT

A meat press including a first frame and a second frame which are moveable with respect to each other, the first frame having support trays to hold meat while cooking and the second frame having pressing trays to exert force on the meat while it is being cooked, and a spring assembly between the first frame and the second frame, the spring assembly including a device to vary the spring force when meat is held between and in contact with the support trays and the pressing trays.

4 Claims, 2 Drawing Figures

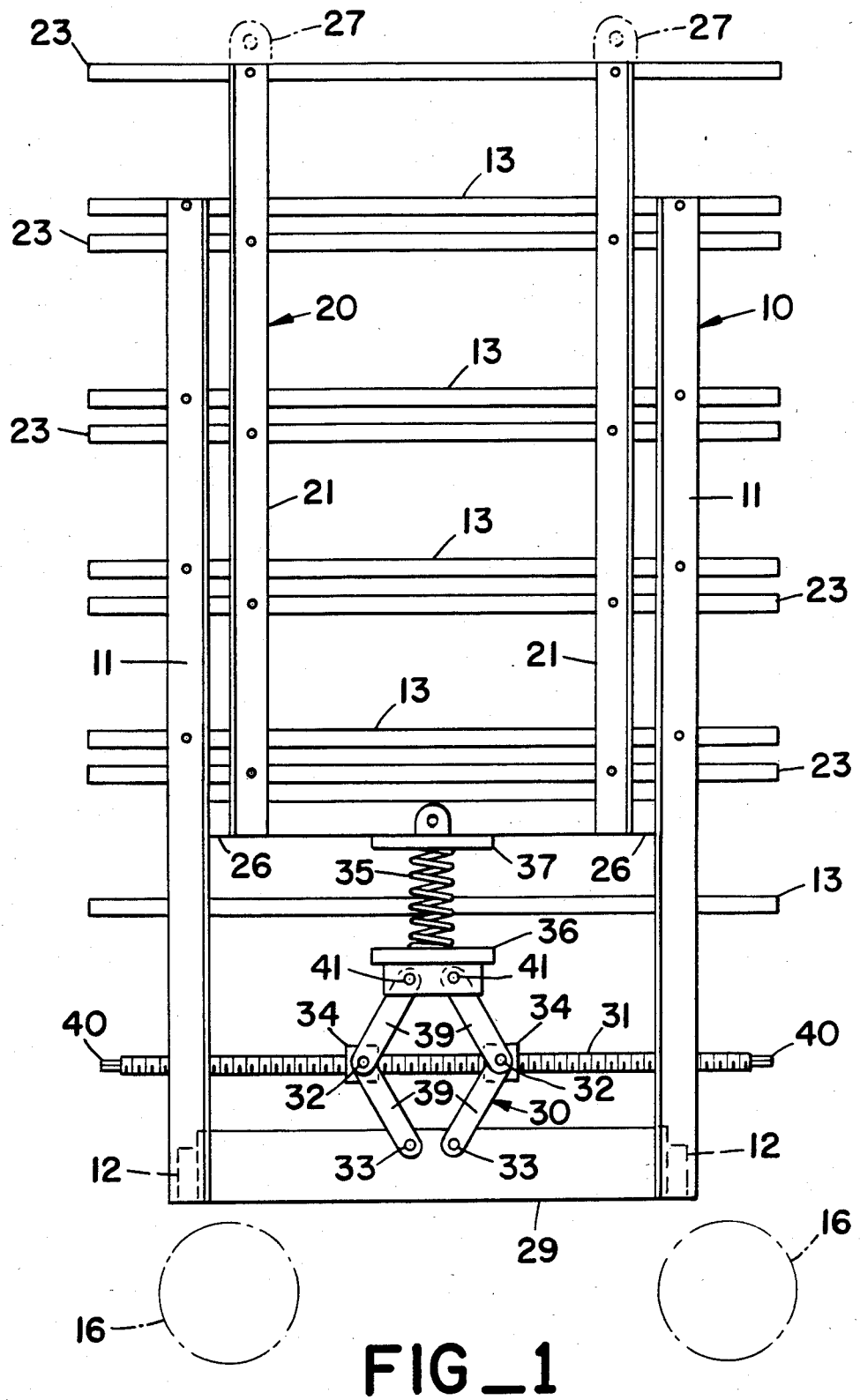
FIG_1

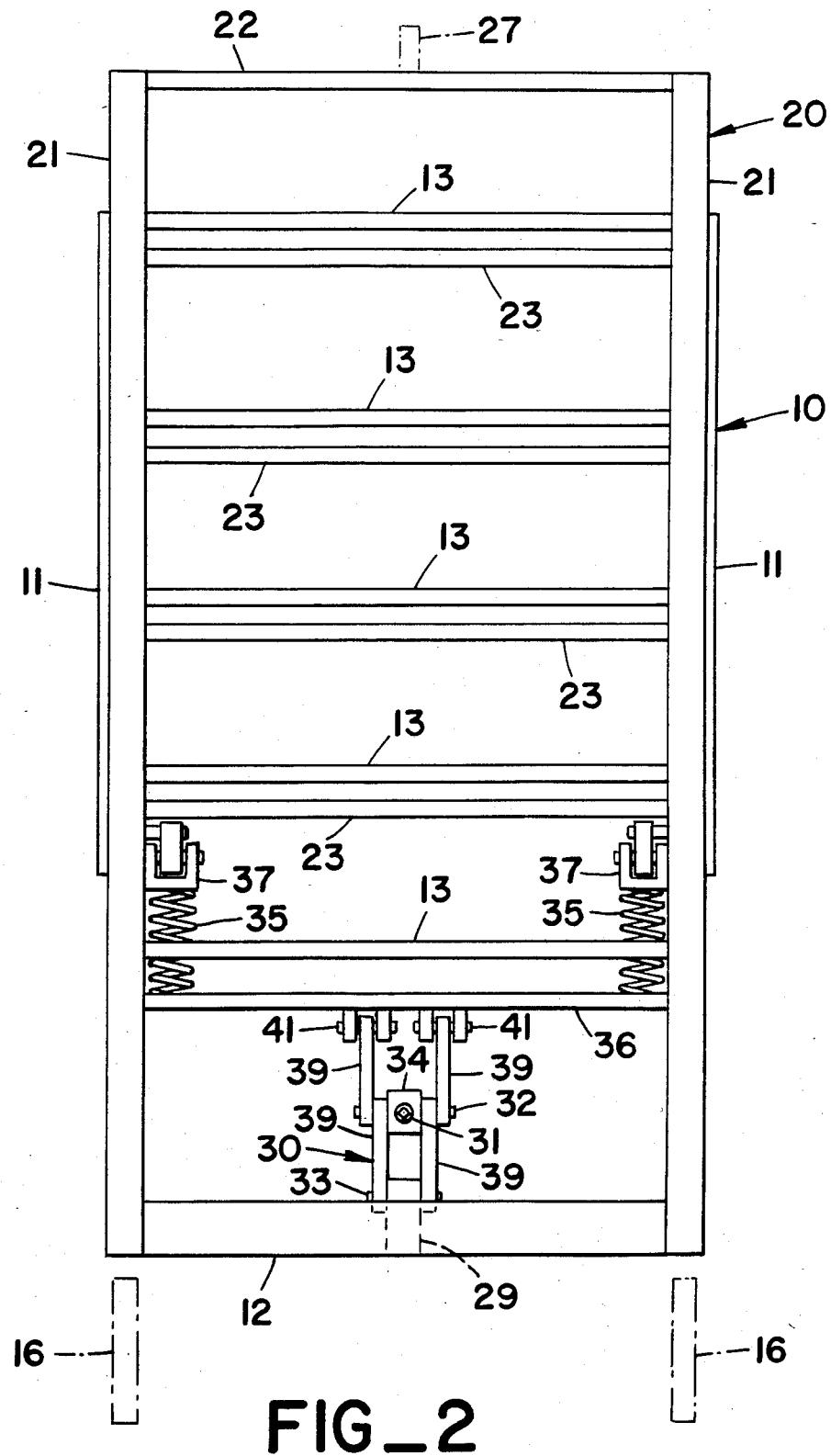
FIG_2

MEAT PRESS

FIELD OF THE INVENTION

This invention is in the field of presses for compressing meat while it is being cooked.

BACKGROUND OF THE INVENTION

It is frequently desirable to press meat while it is being cooked. One of the more common uses for meat presses is in preparing boneless ham. In the process the bone is removed from raw ham leaving a cylindrical hole through the ham. The cylindrical hole is closed by cooking the ham while it is compressed enough so that opposite sides of the hole are brought into contact with each other. During the cooking process protein is released which solidifies between the two contacting faces of the hole causing it to disappear.

The process of cooking ham while it is compressed is usually effected by placing boned raw hams on a supporting tray, usually in the form of a screen, and having a pressing tray exert force on the ham squeezing it between the pressing tray and the supporting tray and cooking the boned ham while it is compressed. Typical meat presses cause force to be exerted by a number of springs connected between the supporting tray and the pressing tray. Employing spring force is very desirable because during the cooking process the hams shrink and springs maintain substantially the same force on the ham during the entire cooking process. The difficulty with using springs is that loading and unloading requires the springs to be expanded which requires the insertion of equipment between the trays and which may result in dangerous release of the springs while a worker's arm is between the trays. It is also diffcult to connect and disconnect multiple springs between the trays and to work between them.

After the presses are loaded with hams, they must be individually placed on a rack or truck by hand. The rack full of hams in their presses is put in an oven or smokehouse, where the hams are cooked. After cooking, the presses must be removed from the rack and opened so that the hams can be removed. Usually the same equipment is used for this re-opening of the presses. During all of these procedures, the presses must be handled by hand. The weight of the hams limits the maximum number which can be placed in a single press to 3 or 4.

The spring-operated devices known to the art are also not adequate because the only way to compensate for smaller-than-usual hams or larger-than-usual hams is to replace the standard springs of the press with larger or smaller springs depending on whether larger or smaller hams are to be cooked.

Other devices have been made which have frames of movable shelves between which hams can be pressed. The shelves are moved by jacks or other positive-displacement mechanisms. This eliminates the handling of individual presses but creates another problem: as the meat shrinks during cooking, the positions of the shelves must be repeatedly adjusted. To do this a worker must enter the oven.

SUMMARY OF THE INVENTION

This invention is a device that overcomes or greatly mitigates the above-enumerated problems found with meat presses used during cooking. The device of this invention includes at least one support shelf or tray that is held in a first frame. Usually the first frame stands on the floor directly or on casters and it includes a plurality of trays. The device also includes a second frame having pressing trays. The same number of pressing trays are used as there are supporting trays and the pressing trays exert force on the hams positioned on the supporting trays during the cooking process. The two frames are capable of moving with respect to one another, usually with one frame being fixed and the other being movable. The first frame may either stand on the floor or be suspended from a rail and the second frame is movable up and down with respect to the first frame.

At least one, and preferably two springs are employed to urge the support trays and the pressing trays toward one another and thereby to exert force on ham that is being pressed while it is being cooked. One end of each spring is connected directly to one of the first frame or the second frame and the other end of the spring is connected to a device fixed to the other of the first frame or the second frame, that device being one which can move the other end of the spring with respect to that frame either to expand the spring or to compress it. Thus, operation of that device can either tighten or release the spring force exerted between the first frame and the second frame, or all spring force urging the frames together can be removed when it is desired to separate the trays to load or unload them. Any desired spring force can be established to compress the hams during the cooking process regardless of whether the hams are standard size, oversized, or undersized. The device to vary the spring force does so by moving the end of the spring with respect to the frame on which the device is mounted either toward or away from the other end of the spring. The preferred embodiment of the device is a toggle that is operated with a threaded rod as will appear more fully in the description of the accompanying drawings.

Although the meat press of this invention is described for convenience with respect to cooking boned hams, it is evident that the press is equally effective to cook other meats or even to cook other foods that are desirably compressed during the cooking process.

BRIEF DESCRIPTION OF THE DRAWINGS

FIG. 1 is an elevation view of a device embodying this invention.

FIG. 2 is a side elevation view of the device illustrated in FIG. 1.

DETAILED DESCRIPTION OF THE INVENTION

The device illustrated in the drawing includes a first frame generally designated 10 which includes columns 11 and bottom bars 12. The first frame includes a number of support trays 13 which are held horizontally by being fastened to the four columns 11 at vertically spaced intervals. Support trays 13 ordinarily are screens that are capable of supporting hams that are held during cooking with downward force applied to them. Support trays 13 are rigid enough not only to hold the hams but also to maintain the spatial relationships among columns 11.

The device also includes a second frame that is generally designated 20. The second frame includes vertical columns 21 and a top bar 22. The second frame 20 also includes pressing trays 23 which are fastened to columns 21 at vertical intervals, and the vertical intervals between trays 23 is the same as the vertical intervals between successive trays 13. Frame 20 is dimensioned so that it may be positioned within frame 10 and slide vertically between columns 11. Suitable bearings 26 are provided to maintain spacing and to reduce friction.

Commercial cooking of meat is sometimes accomplished by suspending the pressing assembly within a furnace, for example by hanging them on hangers 27 illustrated in phantom in FIG. 1, in which case the device is called a cage. Alternatively the device may be supported on wheels such as those shown in phantom as 16 in which case the device is called a truck. When supported on hangers the operating mechanism described hereinafter will cause the support trays to move upwardly toward the pressing trays and when supported on wheels the device will cause the pressing trays to move toward the support trays. The two operations are equivalent.

The device of the drawings includes a toggle support 29 that is fastened to bottom bars 12 located at opposite sides of frame 10. Toggle support 29 is connected through a pivot 33 to a toggle assembly generally designated 30. The toggle assembly includes nuts 34 that ride on threaded bar 31 and which are connected to the toggle assembly through pivots 32. The upper portion of the toggle assembly is connected to springs 35 through a lower spring holder 36 which in turn is connected to the toggle assembly through pins 41 as illustrated. The top of springs 35 are connected to a top spring holder 37 which in turn is connected to the lower portion of columns 21 by conventional means. Toggle 30 is formed conventionally of pivoted links 39.

In operation the threaded rod 31 is rotated in a direction to bring nuts 34 closer together whereby the space between support trays 13 and pressing trays 23 increases. When there is sufficient space between the trays rod 31 is no longer rotated and hams to be cooked are placed on trays 13. When all of trays 13 are loaded, threaded rod 31 is rotated in a direction to move nuts 34 apart and as a result trays 23 and 13 come closer together. Eventually, trays 23 will come in contact with the hams to be cooked and when that contact is made threaded rod 34 is rotated further thereby stretching springs 35. When springs 35 are stretched until the desired force on the hams is exerted between trays 13 and 23 rotation of rod 31 is discontinued. At that point the device is either rolled into an oven or smoke room on casters 16 or moved into the oven or smoke room by an overhead conveyor to which it is connected through hangers 27 and cooking of the hams is begun. As cooking continues the hams will shrink but their diminshed volume is taken up by the force exerted by springs 35 so that during the whole cooking procedure substantially the same compressing force is exerted on the ham.

When cooking of the hams is completed the device is moved out of the oven or smoke room, threaded rod 31 is rotated to move nuts 34 closer to one another whereby the distance between trays 13 and 23 is increased, and when that distance is adequate for workers to remove the cooked hams and to reload the device with uncooked ham, rotation of rod 31 is stopped and the process is complete.

Rod 31, held between nuts 34 as illustrated, may float up and down without any other support. Normally rod 31 will rotate by connecting a power wrench to the square end 40 whereby movement of the trays is very quickly accomplished.

All elements of the device may be made of materials that easily withstand the conditions found in an oven used to bake ham. All elements of the device may be made of metal so that there are no materials such as rubber or plastic that could deteriorate at oven conditions or release volatile components that could cause off flavors in the meat. In addition, all elements in the device are readily accessible for being cleaned so that the sanitary conditions required in the food processing industry are readily met.

Although the device is illustrated employing a toggle as a means to vary spring force and employing tension springs, it is evident that compression springs, leaf springs, torsion springs or other spring forms may be employed and that mechanical means other than the illustrated toggle may be used to vary the spring force that urges the pressing trays and supporting trays toward one another.

What is claimed is:

1. A meat press comprising:
    a first frame having a horizontal meat support tray held between vertical columns,
    a second frame having a horizontal meat pressing tray held between vertical columns, the vertical columns of said second frame being formed to be vertically moveable with respect to the columns of said first frame when said pressing tray is vertically aligned above said support tray,
    a spring assembly connected at one end to said first frame and at the other end to said second frame, said spring assembly including a spring and means to vary the force exerted by said spring when said first frame and said second frame are in contact with meat to be pressed.

2. The meat press of claim 1 having multiple support trays and the same number of pressing trays.

3. The meat press of claim 1 wherein said spring assembly includes two springs.

4. The meat press of claim 1 wherein said means to vary spring force includes a toggle.

* * * * *